United States Patent

Ryals

[11] Patent Number: 5,080,387
[45] Date of Patent: Jan. 14, 1992

[54] COLLAPSIBLE UTILITY CARRIER

[76] Inventor: Dudley R. Ryals, 319 S. Main, Smolan, Kans. 67479

[21] Appl. No.: 590,933

[22] Filed: Oct. 1, 1990

[51] Int. Cl.$^5$ .............................................. B62B 1/20
[52] U.S. Cl. ..................................... 280/645; 280/652; 280/47.24
[58] Field of Search ............... 280/645, 651, 652, 654, 280/655, 655.1, 47.24, 47.26, 638, 35, 639, 79.4; 248/129

[56] References Cited

U.S. PATENT DOCUMENTS

| | | | |
|---|---|---|---|
| 3,400,942 | 9/1968 | Hull | 280/35 |
| 3,892,429 | 7/1975 | dit Dalmy | 280/655 |
| 4,072,319 | 2/1978 | Berger | 280/654 |
| 4,407,521 | 10/1983 | Zeitlin | 280/655 |
| 4,451,053 | 5/1984 | Alioa et al. | 280/47.26 |
| 4,790,559 | 12/1988 | Edmonds | 280/655 |
| 4,846,485 | 7/1989 | Payne | 280/47.18 |

Primary Examiner—Andres Kashnikow
Assistant Examiner—Richard Camby
Attorney, Agent, or Firm—Chase & Yakimo

[57] ABSTRACT

A collapsible utility carrier is provided having an expandable load bearing base frame supported by a rear upright member having wheels attached thereto and a forward upright member having a handle. The forward and rear upright supports are collapsible onto the base frame, as well as the handle, to facilitate storage of the unloaded carrier. The base frame of the carrier is expandable to accommodate a variety of load sizes.

8 Claims, 2 Drawing Sheets

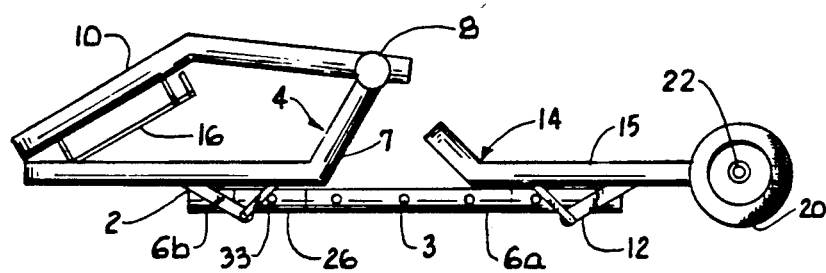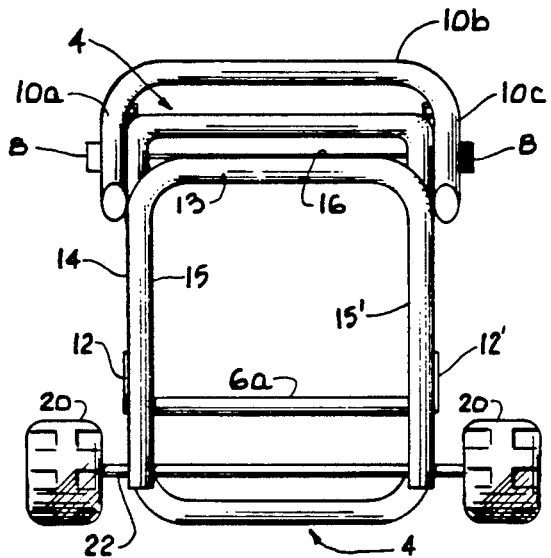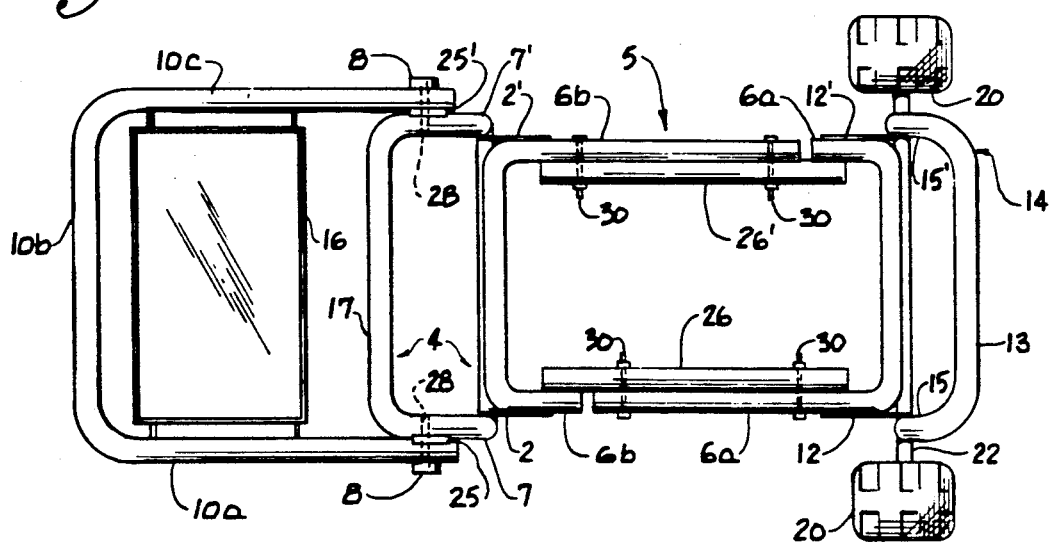

COLLAPSIBLE UTILITY CARRIER

BACKGROUND OF THE INVENTION

1. Field of The Invention

This invention relates to utility carts and to tote carriers. More particularly, the present invention relates to a utility carrier adapted to transport and support objects over paved or earth surfaces and being collapsible to permit ease of storage and unloaded transportation of the carrier.

2. Brief Description of The Prior Art

Utility carts and carriers have been known and utilized to transport a variety of materials and objects over all available surfaces. Carts also have existed in two wheel and four wheel form being both collapsible and fixed in their structure. One use of carriers or carts is in the transport of bulky or heavy objects such as heavy boxes or luggage and the like. For the variety of purposes to which these carts are placed, it is necessary that the carrier be lightweight while at the same time having strength and rigidity sufficient to support heavy loads without buckling. It is a point of further convenience when the unloaded cart may be collapsed upon itself to facilitate ease of storage or the unloaded transport of the cart itself.

One situation in which a utility carrier is particularly useful is in the cartage of recreational ice chests. Such ice chests are commonly utilized for camping, picnics or for cooling of food and beverages at sporting events. When loaded with ice and comestibles the weight of an ice chest can be substantial. Cartage of a loaded ice chest is particularly inconvenient as its generally rectangular shape places the opposing handles apart from each other making it difficult for a single person to carry the loaded ice chest. Even when the individual is of sufficient size to carry an ice chest the weight can place substantial strain on the lower back and is, therefore, an ill-advised if not dangerous procedure. Conventional carriers for objects such as an ice chest are generally simple two wheeled devices which require that the carrier and ice chest be tilted and transported such that the ice chest is not level with the ground. This can result in spillage of liquid from the ice chest as well as shifting of the contents. In addition, the standardly available two wheel carriers are limited to transport of the ice chest and are not suitable for providing any other utility such as making the chest available for seating by individuals.

Therefore, a long standing need has been present for a utility carrier which provides a stable base for an ice chest or cooler and which may serve to transport the ice chest without tilting and which may be folded for convenient storage or carrying when not loaded with an ice chest or other totable materials.

SUMMARY OF THE INVENTION

Accordingly, the above problems and difficulties are obviated by the present invention which provides for a utility carrier which can receive an ice chest or other large object and which is collapsible between an open upright position for loading and carrying of materials and a folded position for storage. The carrier includes a telescoping base frame upon which the load is placed and to which wheels are attached by means of a hinged upright rear support which is utilized to secure the load. A front base frame support or upright member combines front legs to maintain the load in level position when immobile and has a frontwardly extending portion of the support which may serve as a handle by which the carrier can be pulled or pushed. The handle is pivotally attached to the front upright support such that a variety of handle angles may be achieved to permit convenient mobility of the device. The pivotal attachment of the handle also permits the carrier to be collapsed into an even smaller unit than would otherwise be permitted.

Therefore it is an object of the present invention to provide a sturdy utility carrier for supporting and transporting a variety of objects over a wide range of surfaces.

Another object of the present invention is to provide a utility carrier which may be conveniently collapsed into a small conveniently transportable structure.

Yet another object of the present invention is to provide a wheeled utility carrier which will remain level when in a fixed position and permit seating of individuals upon the load.

Other objects and advantages of this invention will become apparent from the following description taken in conjunction with the accompanying drawings, wherein are set forth by way of illustration and example certain embodiments of this invention.

BRIEF DESCRIPTION OF THE DRAWINGS

FIG. 4 is a side elevation of the carrier in a storage mode and showing the front and rear upright members fully collapsed.

FIG. 5 is a rear end view of the carrier in a transport position. For clarity, the phantom lines showing the cooler/load for cartage have been omitted.

FIG. 6 is a top plan view of the carrier in a transport mode and showing the off-set legs of the base frame J-shaped members and the carrying tray affixed to the handle.

DESCRIPTION OF THE PREFERRED EMBODIMENT

Figure 1:
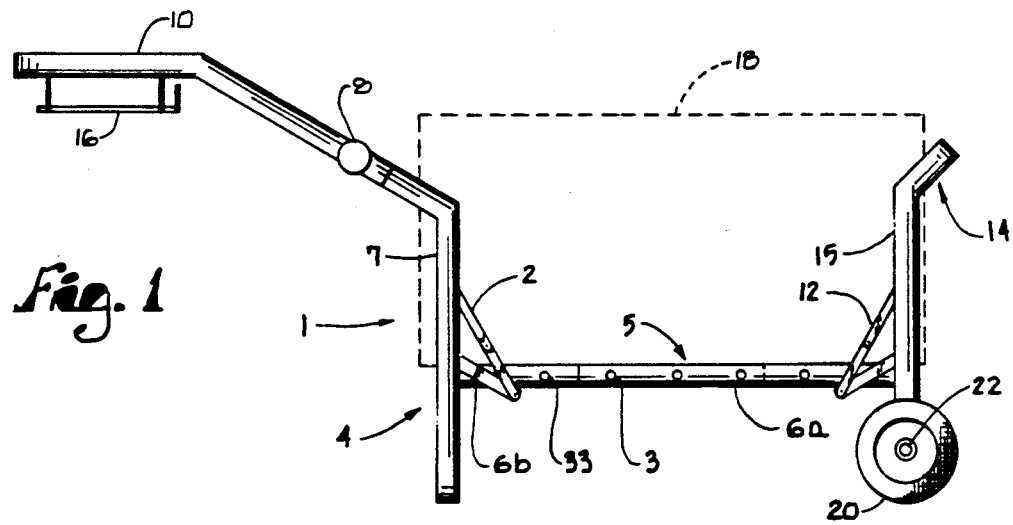
FIG. 1 is a side elevation of the carrier in a transport mode and showing the placement of the handle for movement of the carrier and in phantom lines the placement of a cooler/load for cartage.

Referring to FIG. 1, the carrier 1 has a horizontally disposed base frame 5, all of the components of which may be observed in FIG. 6. The base frame 5 supports a load e.g., ice chest 18. Load 18 is longitudinally held in place by transverse bar 13 of rear vertical support or upright member 14 and transverse bar 17 of front vertical support or upright member 4. As may be observed in FIG. 6, load 18 is also laterally captured between the laterally spaced apart legs 7, 7' and 15, 15' of front and rear upright members 4 and 14.

As shown in FIG. 1, the legs 7, 7' of front upright member 4 and legs 15, 15' of rear upright member 14 are connected to longitudinal support bars 6a, 6b of base frame 5 by a pivot or hinges 2, 2' and 12, 12'. When in their vertical position front and rear upright members 4 and 14 are locked into place by hinges 2, 2' and 12, 12'.

This locking prevents inadvertent collapse of the carrier while in use over rough terrain. Extending through legs 15, 15' of rear upright member 14 is axle 22. Axle 22 extends through apertures in legs 15, 15' of rear upright members 14 to allow rotation of the axle 22 and wheels 20 mounted thereon.

Longitudinally extending from the front upright member 4 is handle 10. Handle 10 comprises a pair of longitudinal struts 10a, 10c with transverse strut 10b extending therebetween. Handle 10 permits the front end of the base frame 5 and front support member 4 to be raised so the entire carrier may be pulled along a surface. Suspended from the struts 10a, 10c of handle 10 is tray 16 which may be utilized for holding containers or as a serving area. As may be more readily observed in FIG. 5, the struts 10a, 10c of handle 10 are pivotally mounted about pins 28, 28' which extend through the struts 10a, 10c and legs 7, 7' of front upright 4. Lock knobs 8 are screwed to the free ends of each pin 28, 28' to secure the struts to the legs. As lock knobs 8 are screwed onto pins 8a struts 10a, and 10c of handle 10 are compressed against legs 7, 7' and are captured by flanges 25, 25' thereby securely holding handle 10 in position with respect to legs 7, 7'. Flanges 25, 25' serve to prevent handle 10 from rotating with respect to legs 7, 7' when it is desired to move the carrier by raising transverse strut 10b. In this manner flanges 25, 25' serve to transmit the lifting force applied to strut 10b to legs 7, 7' of carrier 1.

Figure 2:
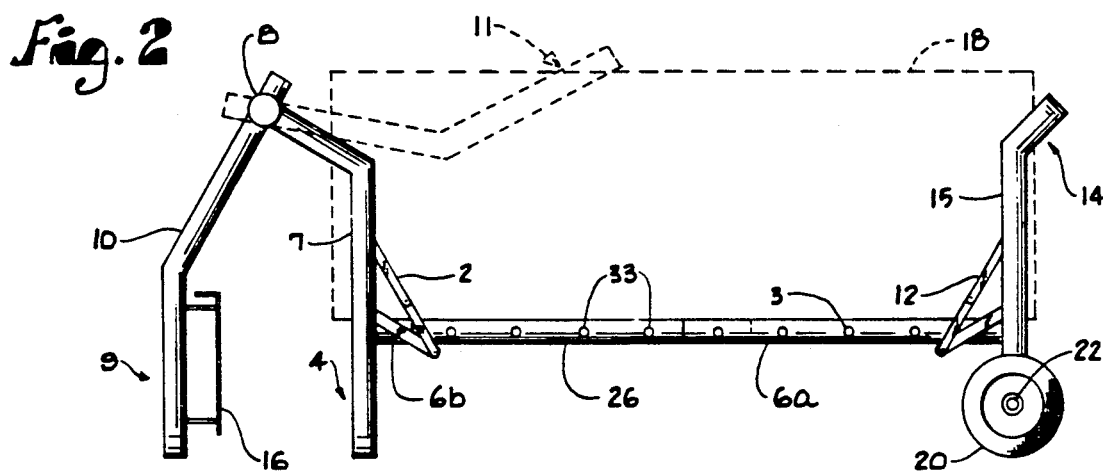
FIG. 2 is a side elevation of the invention showing the base frame length extended and showing in phantom lines the placement of a cooler/load for cartage. Also shown is a second position of the handle, and in phantom lines, a third handle position.

Referring now to FIG. 2 in conjunction with FIG. 6 the adjustability of base frame 5 is described. In FIG. 6 the components of the base frame may be observed. Each support bar 6a, 6b is bent to provide a longer and a shorter arm or a substantially J-shape. Alternatively the support bar may be bent to provide arms of approximately equal length. The bent support bar 6a, 6b may be characterized as having three sections comprising the two arms and a strut spanning the arms. A brace member 26, 26' joins the opposing or facing supports to provide a means for adjusting the distance between the supports in conjunction with a series of registrable voids 3 and 33. Securing pins or bolts 30 are passed through the voids or holes in the supports 6a, 6b and brace 26a, 26b of the base frame 5 components to maintain the supports of base frame 5 in the desired facing relationship.

When it is desired to extend the length of base frame 5 securing pins 30 may be removed from aligned adjusting voids or holes 3 and 33 in both the J-shaped support bar members 6a, 6b and braces 26a, 26b. J-shaped support bar 6b is separated from J-shaped support bar 6a to increase the length of the base frame 5. Brace members 26, 26' are respectively attached to the short legs of each of support bars 6a and 6b. These braces 26, 26' act as extensions of the legs or arms of the respective J-shaped support bar 6a, 6b. Each brace member 26, 26' is offset inwardly from the support bar 6a or 6b. Thus, the brace member 26, 26' lies adjacent the opposite support bar 6a or 6b. To adjust and fix the base frame 5 at the desired length, the adjusting holes 3 in support bar 6a or 6b and the adjusting holes 33 in the brace members 26, 26' are brought into registration allowing the brace members 26, 26' and the adjacent support bar 6a or 6b to be bolted together.

When the desired length is achieved securing pins 30 are reinserted through adjusting holes 3 in support bars 6a and 6b and adjusting holes 33 in the respective brace members 26, 26' to lock the base frame 5 into position for support of load 18. When base frame 5 is completely contracted the exterior of base frame 5 is substantially comprised by an outer perimeter of support bars 6a and 6b, with brace members 26, 26' spaced inwardly from the respective support bars 6a, 6b.

It is important to note that the base frame 5 presents a stable load bearing surface throughout the range of its extended and collapsed positions. This is accomplished by the slideable relationship between each of the J-shaped support bars 6a and 6b and brace members 26, 26' which are attached to the support bars 6a, 6b. The brace members 26, 26' are attached to the shortened leg of the support bars 6a and 6b and inwardly spaced with respect thereto. This inward spacing of brace members 26, 26' permits the longer leg of the opposite support bar 6a or 6b to slide along the outside of brace member 26, 26'. In this fashion the internal distance between the two sides of the base frame 5 remains substantially constant in all positions. This substantially constant separation between the sides of base frame 5 offers complete support to the load and avoids the potential for slippage of a load through the interior base frame 5 as base frame 5 is extended.

Referring again to FIG. 2 the adjustability of handle 10 may be observed. Depending upon the space available or other considerations, handle 10 may be freed from its locked position (FIG. 1) by unscrewing knob 8 from strut pin 28. This allows for rotation of arms 10a, 10c about pin 28 through a full range of positions. Upon reaching the desired position knobs 8 are screwed onto pins 28 to tighten legs 10a, 10c within flanges 25, 25' affixed to legs 7, 7'. Two such positions are illustrated by lower handle position 9 (FIG. 2) or raised handle position 11 (FIG. 2).

Figure 3:
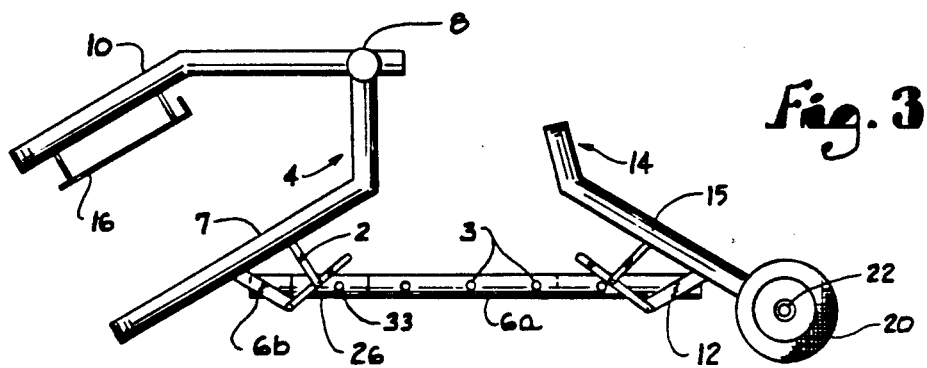
FIG. 3 is a side elevation showing the front and rear upright members of the invention partially collapsed.

Referring now to FIGS. 3 and 4 the manner of collapsing the utility cart upon itself may be observed. In FIG. 3 the utility carrier is shown in a state of partial collapse. Rear hinges 12, 12' of rear upright 14, released from their locked position, allow the upper end of rear upright 14 to be pushed inwardly with respect to the base frame 5. Rear upright 14 is then depressed inwardly until it is in contact with base frame 5 and parallel thereto. Handle 10 is next released by unscrewing lock knob 8 to release handle 10 from capture within flanges 25, 25' and to permit the handle to swing freely into lower handle position 9 (FIG. 2). Front hinges 2, 2' are then released from their locked position and forward upright 4 is pressed inwardly with respect to base frame 5 until it is in substantial contact with base frame 5 as shown in FIG. 4. Handle 10 then rests against the lower end of forward upright 4. Lock knobs 8 may then be rotated to secure handle 10 in its collapsed position as shown in FIG. 4.

Once collapsed, the utility carrier operates as a two-wheeled cart. The utility carrier may be held by handle 10 and raised so that the collapsed utility carrier may be rolled along the ground by wheels 20. In this collapsed state the utility carrier requires a fraction of the space it would normally fill in its fully opened state. The collapsed carrier may be hung on a wall or stored in a garage or vehicle. To reopen the utility carrier to its open position the above steps are reversed until the utility carrier resumes the configuration of FIGS. 1 or 2.

Referring now to FIG. 5, wherein an end view of the preferred embodiment of the present invention is illustrated, the single piece construction of the forward upright 4 and the rear upright 14 may be observed. This single piece construction eliminates the need for additional cross bracing of the utility carrier and imparts structural strength and stability.

When it is desired to carry a load 18 on the utility carrier, the length of the base frame 5 is adjusted to a length slightly less than the length of the load 18. This permits the weight of the load to be supported by the base frame 5 and allows capture of the load 18 between the laterally spaced apart legs 7, 7' and 15, 15' of the uprights 4 and 14 so as to prevent shifting. The handle 10, being previously locked into the cartage position as shown in FIG. 1, may then be lifted upwardly so as to disengage forward upright 4 from the ground to permit wheeled movement by wheels 20. The carrier and load 18 may then be transported.

When the utility carrier is in a satisfactory location the handle 10 may be lowered to place handle 10 in an out of the way position. Alternatively, handle 10 may be left in its extended position so that tray 16 may be utilized for serving purposes.

It is to be understood that while certain forms of this invention have been illustrated and described it is not limited thereto, except in so far as such limitations are included in the following claims.

Having thus described the invention, what is claimed as new and desired to be secured by Letters Patent is:

1. A collapsible load bearing utility carrier comprising:
    a base frame comprising a pair of supports having;
    a first arm;
    a second arm;
    a strut spanning said arms, said supports being positioned in a facing relationship such that said arms and said struts substantially form a perimeter of said frame with said struts defining longitudinal ends of said frame and said arms defining sides of said frame;
    means for maintaining sad supports in said facing relationship;
    means for adjusting the distance between said supports in said facing relationship thereby allowing adjustment of the distance between said struts and the length of said frame;
    a first vertical support pivotally attached to a first end of said base frame;
    means for rollably supporting said first vertical support;
    a second vertical support pivotally attached to a second end of said base frame;
    a handle extending from said second vertical support;
    means for pivotally attaching said handle to said second vertical support; and
    said pivotal attachments of said first and second vertical supports and said handle providing for collapse of said elements onto said base frame.
2. The device as claimed in claim 1, wherein said adjusting means comprises:
    a brace joining said arms forming each side of said frame;
    a series of voids along the length of each brace;
    a series of voids along the length of at least one of said arms forming each side of said frame, said voids of each brace and said at least one of said joined arms being selectably registrable, said registration adjusting the distance between said facing supports and said struts thereof; and
    said maintaining means retaining said registration of said voids and thereby retaining said distance between said supports.
3. The device as claimed in claim 2, wherein said maintaining means comprises:
    a pin, insertable into said registered voids to maintain said registered voids in place.
4. The device as claimed in claim 1, wherein said means for rollably supporting comprises:
    an axle attached to said first vertical support; and
    wheels mounted on said axle.
5. The device as claimed in claim 1, wherein said pivotally attaching means comprises:
    a pair of opposing pins extending from said second vertical support, said pins passing through said handle to permit said handle to be rotated.
6. In a load bearing utility carrier a base frame comprising:
    a pair of supports comprising,
        a first arm,
        a second arm,
        a strut spanning said arms, said supports being positioned in a facing relationship such that said arms and said struts substantially form a perimeter of said frame with said struts defining longitudinal ends of said frame and said arms defining sides of said frame,
    means for maintaining said supports in said facing relationship,
    means for adjusting the distance between said supports in said facing relationship thereby allowing adjustment of the distance between said struts and the length of said frame,
    said means for adjusting comprising,
        a brace joining said arms forming each side of said frame,
        a series of voids along the length of each brace,
        a series of voids along the length of at least one of said arms forming each side of said frame, said voids of each brace and said at least one of said joined arms being selectably registrable, said registration adjusting the distance between said facing supports and said struts thereof, and
    said maintaining means retaining said registration of said voids and thereby retaining said distance between said supports,
    means for rollably supporting said base frame.
7. The device as claimed in claim 6, wherein said maintaining means comprises:
    a pin, insertable into said registered voids to maintain said registered voids in place.
8. The device as claimed in claim 6, wherein said means for rollably supporting comprises:
    at least one axle attached to said supports; and
    wheels mounted on said axle.

* * * * *

UNITED STATES PATENT AND TRADEMARK OFFICE
CERTIFICATE OF CORRECTION

PATENT NO. : 5,080,387
DATED : January 14, 1992
INVENTOR(S) : Dudley R. Ryals

It is certified that error appears in the above—identified patent and that said Letters Patent is hereby corrected as shown below:

In claim 1, column 5, line 39, change "sad" to "said".

Signed and Sealed this

Thirtieth Day of March, 1993

Attest:

STEPHEN G. KUNIN

*Attesting Officer*     *Acting Commissioner of Patents and Trademarks*